No. 764,787.

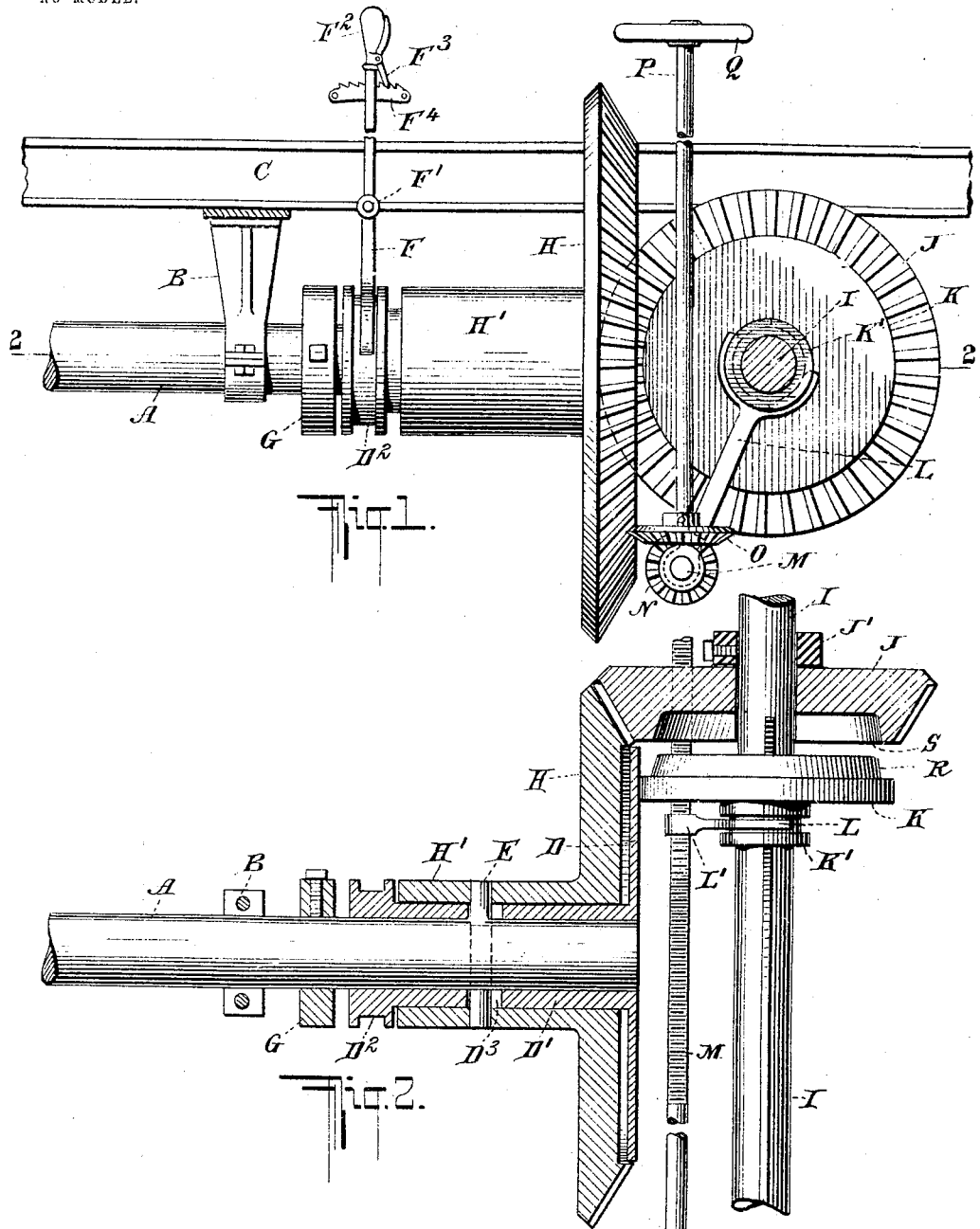

Patented July 12, 1904.

UNITED STATES PATENT OFFICE.

LAWRENCE ABRAHAM, OF NEW YORK, N. Y.

DRIVING MECHANISM.

SPECIFICATION forming part of Letters Patent No. 764,787, dated July 12, 1904.

Application filed February 19, 1904. Serial No. 194,340. (No model.)

*To all whom it may concern:*

Be it known that I, LAWRENCE ABRAHAM, a citizen of the United States, and a resident of the borough of Brooklyn, county of Kings, city and State of New York, have invented certain new and useful Improvements in Driving Mechanisms, of which the following is a specification.

My invention relates to driving mechanism, and more particularly to driving mechanism used in automobiles or other power-driven vehicles, and has for its object to provide a simple and efficient device for changing from one speed to another.

Other features of my invention will appear from the description following hereinafter and from the appended claims.

Reference is to be had to the accompanying drawings, in which—

Figure 1 is a side view of a portion of a vehicle, showing my invention applied thereto; and Fig. 2 is a sectional view of the same in a slightly-different position substantially on the line 2 2 of Fig. 1.

A is the main or power shaft supported by brackets or bearings B, attached in any suitable manner to the frame C of the vehicle. Power may be applied to the shaft A in any customary manner, either directly or indirectly.

Upon the shaft A is movably mounted a friction-disk D. Forming part of or secured to this disk D is a collar or sleeve D', terminating in a head or enlargement D². The said collar or sleeve D' is provided with slots D³, through which is adapted to pass a pin E, secured to the shaft A. Thus the sleeve D' and the disk D are arranged to rotate with the shaft A, but are capable of a longitudinal movement relatively thereto. A forked arm F, fulcrumed on the frame C at F' and having a handle F², is provided for the purpose of shifting the sleeve D', and with it the friction-disk D, along the shaft A. The handle F² is provided with a pivoted detent F³, coöperating with a toothed segment F⁴, so that the sleeve D' and disk D may be securely held in any position to which they may be shifted. The segment F⁴ may be mounted on the vehicle in any suitable manner. A collar G is provided for the purpose of preventing the sleeve and friction-disk from being moved too far, although the same is not absolutely necessary, the slots D² and the pin E serving the same purpose. A bevel-gear H, having a sleeve H', is mounted on the sleeve D' and is secured to the shaft A by the pin E, which passes through the sleeve D'. Thus the shaft A, the disk D, and the bevel-gear H will rotate together.

I is the driven or auxiliary shaft, upon which is loosely mounted a bevel-gear J, in permanent mesh with the bevel-gear H and held in position by a collar J'. A friction-wheel K is slidably mounted on the shaft I by means of a key or other suitable mechanism and is adapted to rotate therewith. The friction-wheel K under certain conditions, which will be explained hereinafter, is arranged to engage the friction-disk D. The friction-wheel K is provided with a sleeve K'. A fork L straddles the sleeve K' and has a portion L', internally screw-threaded, arranged to coöperate with the screw-threaded shaft or rod M for the purposes hereinafter explained. The shaft or rod M may be supported in any convenient manner and has secured to it a bevel-pinion N, arranged to mesh with a bevel-gear O, secured to an upright shaft or rod P. A hand-wheel Q is fastened to the upper end of the rod P for the purpose of turning the same. The rod P, with the hand-wheel Q and the bevel-gear O, may be supported on the frame of the vehicle in any suitable manner. The friction-wheel K is further provided on the opposite side to the sleeve K', with a clutch member R arranged to coöperate with a mating clutch member S, forming part of the bevel-gear J.

The operation of the device is as follows: Power is applied in any customary manner to the shaft A, which in turn rotates the friction-disk D and the bevel-gear H. If the parts are now in the position illustrated in Fig. 2, motion will be transmitted from the friction-disk D to the friction-wheel R and to the shaft I, with which are connected either directly or indirectly the driving-wheels of the vehicle. The bevel-gear J meanwhile rotates idly. If now it is desired to run at a slower speed, the operator will turn the hand-wheel Q to rotate the bevel-gear O, and thus transmit motion to the screw-threaded shaft M and move the fork L along the shaft M, and with it the friction-wheel K, nearer to the center of the friction-disk D. It will be understood that the nearer the friction-wheel K is moved to the center of the disk D the slower will be the speed transmitted to the shaft I and the nearer the said wheel K is moved to the periphery of the disk D the faster will be the speed of the shaft I. While traveling at ordinary speeds, the friction-drive alone will be found sufficient for all purposes. If now it is desired to run at the highest speed, the handle F² is moved to the right, thus swinging the forked arm F on its pivot F' and sliding the sleeve D', and with it the friction-disk D, to the left in the drawings. This will disconnect the friction-disk D from the friction-wheel K and leave the said wheel K free to be moved along the shaft I without peripheral friction. This is done by turning the hand-wheel Q, and with it the rod P and the bevel-gear O, which will transmit motion to the bevel-pinion N and the rod or shaft M. The rod or shaft being screw-threaded and only capable of a rotary movement will move the fork L in the predetermined direction (in this instance toward the bevel-gear I) until the clutch member R engages the mating clutch member S, whereupon motion will be transmitted from the bevel-gear H to the bevel-gear J and to the shaft I, the said bevel-gear J being now practically fast on the shaft I through the medium of the clutch R S. With this arrangement a positive and direct transmission is secured when running at the highest speed, and all danger of slipping, which might occur if the friction-drive were used while running at the highest speed, is obviated. It will be obvious that the friction-disk D may be left in the position shown in Fig. 2 while the friction-wheel K is being moved outward until the said friction-wheel becomes clutched to the bevel-gear J, the friction-disk D being then removed from contact with the friction-wheel K.

Although preferable, it is not absolutely necessary that the friction-disk D be movable lengthwise of the shaft A; but the disk D might be rigidly secured to or even formed integral with the bevel-gear H.

The bevel-gear J (although in one sense it is a driven member, since it receives its motion from the bevel-gear H) may also be termed a "clutch driving member," since it is adapted to drive the sliding wheel K, and through it the shaft I, when said sliding wheel comes into clutching engagement with the said bevel-gear H.

It will be understood that by moving the friction-wheel K beyond the center of the friction-disk D the direction in which the shaft I rotates will be reversed.

Various modifications may be made without departing from the nature of my invention.

What I claim, and desire to secure by Letters Patent, is—

1. A driving mechanism comprising a main shaft, a plurality of driving members mounted on said main shaft, one of said members being fast on said shaft and the other being mounted to slide lengthwise of the shaft, an auxiliary shaft, a plurality of driven members on said auxiliary shaft adapted to engage the driving members, one of said driven members being loose relatively to the auxiliary shaft and the other having a sliding connection therewith, and means for moving said sliding member along said auxiliary shaft.

2. A driving mechanism comprising a main shaft, a driving member fast on said main shaft, a second driving member mounted to rotate with said main shaft but slidable thereon, an auxiliary shaft, a driven member mounted loosely on said auxiliary shaft in engagement with said first-named driving member, another driven member mounted to turn with said auxiliary shaft but having a sliding connection therewith and arranged to engage said second-named driving member, means for disconnecting said second-named driving member from said second-named driven member and means for throwing said second-named driven member into engagement with said first-named driven member.

3. A driving mechanism comprising a main shaft, a driving member fast on said main shaft, a second driving member mounted to rotate with said main shaft but slidable thereon, means for shifting said slidable member on said main shaft, means for retaining said shifting means in the position to which it is shifted, an auxiliary shaft, a driven member loosely mounted on said auxiliary shaft and in engagement with said first-named driving member, a second driven member mounted to rotate with said auxiliary shaft but slidable thereon, and adapted to engage said second-named driving member, and means for throwing said second-named driven member into engagement with the first-named driven member.

4. A driving mechanism comprising a main shaft, a driving member mounted to rotate with said shaft but slidable thereon, and provided with a sleeve having a slot, a second driving member mounted on the sleeve of said first-named driving member, a pin connecting said second-named driving member with the main shaft and passing through the slot of the first-named driving member, means for shifting said first-named driving member, an auxiliary shaft, a driven member mounted to rotate with said auxiliary shaft but slidable thereon and arranged to engage the first-named driving member, a second driven member loosely mounted on said auxiliary shaft and in engagement with said second-named driving member, and means for throwing the first-named driven member into engagement with the second-named driven member.

5. A driving mechanism comprising a main shaft, a friction-disk provided with a sleeve and mounted to rotate with said main shaft but slidable thereon, a bevel-gear mounted on the sleeve of the friction-disk and secured to the main shaft to rotate therewith, an auxiliary shaft, a friction-wheel mounted on said auxiliary shaft to rotate therewith but slidable thereon, and arranged to engage said friction-disk, a bevel-gear loosely mounted on said auxiliary shaft and in engagement with said first-named bevel-gear, means for shifting said friction-disk into or out of engagement with the friction-wheel, and means for throwing the friction-wheel into or out of engagement with the loose bevel-gear.

6. A driving mechanism comprising a main shaft, a friction-disk mounted to rotate with said main shaft but slidable thereon, said friction-wheel being provided with a sleeve having a slot and terminating in a head, a forked arm arranged to straddle said head and adapted to shift said friction-disk into different positions, means for retaining the said friction-disk in any of its positions, a bevel-gear mounted on said sleeve of the friction-disk, a pin passing through the slot in the said sleeve and connecting the bevel-gear to the said main shaft, an auxiliary shaft, a friction-wheel mounted to rotate with said auxiliary shaft but slidable thereon, and arranged to engage said friction-disk, said friction-wheel being provided on its one face with a clutch member, a bevel-gear provided with a mating clutch member and loosely mounted on said auxiliary shaft in engagement with said first-named bevel-gear, and means for shifting said friction-wheel along the face of the friction-disk and adapted under certain conditions to throw the clutch member on the friction-wheel into engagement with the clutch member of the bevel-gear.

7. In a driving-gear, a variable-speed reversing friction driving mechanism comprising a driving member and a driven member, one of which is movable toward and from the center of the other to both sides of said center, and a positive driving mechanism arranged to be thrown into operation automatically when said movable member reaches a predetermined position and arranged to drive the said driven member in the same direction in which it is driven by the friction driving member immediately before the said position is reached.

8. In a driving-gear, a driven friction member movable axially, a driving friction member movable axially into and out of engagement with said driven friction member, and a driving clutch member coaxial with said driven friction member and adapted for clutching engagement therewith.

9. In a driving-gear, a driven member having a friction-surface and a toothed surface, a toothed clutch member meshing directly with the toothed surface of said driving member, and a driven friction member coaxial with said toothed clutch member and movable toward and from the axis of the driving member.

In testimony whereof I have hereunto set my hand in the presence of two subscribing witnesses.

LAWRENCE ABRAHAM.

Witnesses:
HENRY WILHELM,
P. J. BREWIN.